United States Patent [19]

Graser

[11] 4,446,324
[45] May 1, 1984

[54] PERYLENETETRACARBOXYLIC ACID DIIMIDES AND THEIR USE

[75] Inventor: Fritz Graser, Ludwigshafen, Fed. Rep. of Germany

[73] Assignee: BASF Aktiengesellschaft, Ludwigshafen, Fed. Rep. of Germany

[21] Appl. No.: 329,073

[22] Filed: Dec. 9, 1981

[30] Foreign Application Priority Data

Dec. 27, 1980 [DE] Fed. Rep. of Germany ....... 3049215
Sep. 17, 1981 [DE] Fed. Rep. of Germany ....... 3136894

[51] Int. Cl.³ .............................................. C09B 3/16
[52] U.S. Cl. ................................................... 546/37
[58] Field of Search ......................................... 546/37

[56] References Cited

FOREIGN PATENT DOCUMENTS

| | | |
|---|---|---|
| 33079 | 8/1981 | European Pat. Off. . |
| 1094897 | 12/1960 | Fed. Rep. of Germany ........ 546/37 |
| 1807729 | 6/1970 | Fed. Rep. of Germany . |
| 2139688 | 2/1973 | Fed. Rep. of Germany ........ 546/37 |
| 2210170 | 9/1973 | Fed. Rep. of Germany ........ 546/37 |
| 2237539 | 2/1974 | Fed. Rep. of Germany . |
| 3001858 | 7/1981 | Fed. Rep. of Germany ........ 546/37 |
| 2148510 | 3/1973 | France . |

OTHER PUBLICATIONS

Graser et al., Liebigs Ann. der Chemie 1980, pp. 1994–2011.

*Primary Examiner*—D. G. Daus
*Assistant Examiner*—William A. Teoli, Jr.
*Attorney, Agent, or Firm*—Oblon, Fisher, Spivak, McClelland & Maier

[57] ABSTRACT

Novel perylene-3,4,9,10-tetracarboxylic acid diimides of the formula

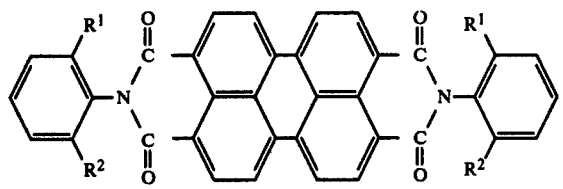

where $R^1$ and $R^2$ are each isopropyl or $R^1$ is methyl or ethyl and $R^2$ is $C_3$- or $C_4$-alkyl, give clear, luminous, very lightfast, fluorescent orange colorations in plastics.

The dyes are particularly suitable for concentrating light.

1 Claim, No Drawings

PERYLENETETRACARBOXYLIC ACID DIIMIDES AND THEIR USE

The present invention relates to novel perylene-3,4,9,10-tetracarboxylic acid diimides and their use.

The novel dyes have the formula

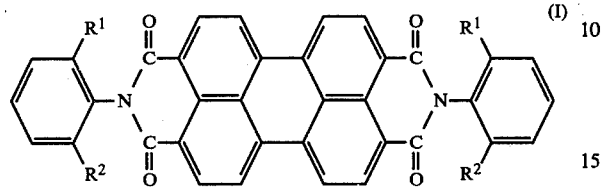

where $R^1$ and $R^2$ are each isopropyl or $R^1$ is methyl or ethyl and $R^2$ is $C_3$- or $C_4$-alkyl, and have particularly good fastness characteristics.

The dyes may be prepared in a conventional manner by condensing perylene-3,4,9,10-tetracarboxylic acid or its anhydride with the corresponding 2,6-disubstituted aniline in a solvent or diluent, for example quinoline, naphthalene or trichlorobenzene, or in a large excess of the aniline, at from 180° to 230° C. The reaction is advantageously carried out in the presence of a condensation accelerator, for example zinc chloride, zinc acetate, zinc propionate or hydrochloric acid.

The dye is isolated from the reaction mixture in a conventional manner, for example by filtration or centrifugation of the reaction mixture at 20°–80° C., where appropriate after dilution with an inert organic liquid in which the diimide is insoluble, preferably a lower alcohol, such as methanol, ethanol, isopriopanol or isobutanol.

The dye can also be isolated by dissolving the entire reaction mixture by addition of an organic liquid in which the dye is readily soluble, for example N-methylpyrrolidone or a lower carboxylic acid amide, eg. dimethylacetamide or, preferably, dimethylformamide, at from 50° to 150° C., preferably from 70° to 120° C., filtering the solution and precipitating the diimide from the filtrate with an organic liquid in which the dye is insoluble or only slightly soluble, for example a lower alcohol, preferably methanol, which may or may not be mixed with water. The dye is usually obtained in a sufficiently pure form by this procedure.

The remove residual traces of perylene-3,4,9,10-tetracarboxylic acid, the dye may be boiled with dilute sodium hydroxide solution potassium hydroxide solution or sodium carbonate solution. If required, the isolated material can be treated with a complexing agent, eg. tetrasodium ethylenediaminetetraacetate, to remove any heavy metal ions present. It is also possible to combine the two aftertreatments. If necessary, the dye may be purified yet further by reprecipitation from sulfuric acid or by recrystallization.

The novel dyes are exceptionally suitable for coloring plastics, especially for mass-coloring polystyrene and rigid PVC. They give very clear, luminous, fluorescent orange colorations which are very lightfast. They may also be used in a mixture with other dyes for coloring plastics, and again very clear, brilliant orange colorations are obtained. Furthermore, the novel dyes are exceptionally useful for the production of plastic sheets for concentrating light, of the type described in German Laid-Open Application DOS No. 2,620,115 (equivalent to U.S. Pat. No. 4,110,123), in which they serve as fluorescence centers.

Dyes I where $R^1$ and $R^2$ are each $-CH(CH_3)_2$ or $R^1$ is methyl or ethyl and $R^2$ is $-CH(CH_3)_2$, $-C(CH_3)_3$ or, in particular,

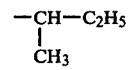

are preferably used for this purpose.

Especially preferred diimides I are those where $R^1=R^2=$isopropyl or $R^1$ is $-C_2H_5$ and $R^2$ is

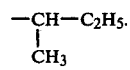

The dyes must be very pure for the last-mentioned use. The synthesis products are therefore purified, for example by fractional precipitation from sulfuric acid, recrystallization or a combination of purification operations.

For coloring plastics, diimides can as a rule be used in the form in which they are obtained in the synthesis.

Perylenetetracarboxylic acid bis-arylimides, for example the industrially useful arylimides derived from p-aminoazobenzene, p-phenetidine, p-anisidine, 3,5-dimethylaniline or p-chloroaniline, at normal processing temperatures give red colorations which do not fluoresce. In contrast, the novel dyes give luminous orange colorations which are transparent and fluoresce in daylight. The novel dyes are also substantially more easily soluble in organic solvents and in plastics than are, for example, the above bis-arylimides. Because of their greater solubility, much better distribution in the plastics is achievable with the novel dyes, so that special fine dispersion treatments or finishing treatments prior to use are not absolutely essential.

The parts in the following Examples are by weight.

EXAMPLE 1

98.8 parts of perylene-3,4,9,10-tetracarboxylic acid dianhydride, 355 parts of 2-(but-2'-yl)-6-ethylaniline, 13.6 parts of zinc oxide and 40 parts of glacial acetic acid are introduced into 750 parts of quinoline. The mixture is heated at from 225° to 235° C., under a slow stream of nitrogen, and is kept at this temperature until perylenetetracarboxylic acid is no longer detected when a sample is boiled in dilute potassium carbonate solution, ie. for about 16 hours. After the mixture has been cooled to about 80° C., it is diluted with 1,000 parts of methanol and the suspension is poured onto 4,000 parts of methanol at room temperature and, after having been stirred overnight, is filtered. The material on the filter is washed with methanol and then with water, and is stirred with 3,500 parts of 2% strength aqueous potassium carbonate solution, the mixture is heated at about 95° C. and filtered, and the material on the filter is washed neutral and dried. Any traces of perylenetetracarboxylic acid still present are thereby removed. A very good yield of dye is obtained.

If 49 parts of zinc propionate are used instead of zinc oxide and glacial acetic acid and the reaction is carried out under otherwise identical conditions, the same dye is obtained, again in very good quality and yield.

If, instead of 2-(but-2-yl)-6-ethylaniline, 2-(but-2-yl)-6-methylaniline or 2-tert.butyl-6-ethylaniline is used, the corresponding perylenetetracarboxylic acid diimide is obtained in good yield and quality.

EXAMPLE 2

54.9 parts of perylene-3,4,9,10-tetracarboxylic acid dianhydride, 84 parts of 2-methyl-6-isopropylaniline and 27.3 parts of anhydrous zinc propionate are introduced into 750 parts of quinoline. The mixture is heated at from 225° to 235° C., under a slow stream of nitrogen, and is kept at this temperature until perylenetetracarboxylic acid is no longer detected when a sample is boiled in dilute potassium carbonate solution, ie. for about 14 hours. After the mixture has been cooled to about 80° C., it is diluted with 5,000 parts of methanol and, after having been stirred overnight, is filtered. The material on the filter is washed with methanol and then with water, and is stirred with 1,500 parts of 2% strength aqueous potassium carbonate solution, the mixture is heated at about 95° C. and filtered, and the material on the filter is washed neutral and dried. Any traces of perylenetetracarboxylic acid still present are thereby removed. A very good yield of dye is obtained.

EXAMPLE 3

The procedure described in Example 2 is followed, using 92 parts of 2-ethyl-6-isopropylaniline instead of 2-methyl-6-isopropylaniline. A very good yield of perylene-3,4,9,10-tetracarboxylic acid bis-(2'-ethyl-6'-isopropylanilide) is obtained.

EXAMPLE 4

98.4 parts of perylene-3,4,9,10-tetracarboxylic acid dianhydride, 354 parts of 2,6-diisopropylaniline, 13.6 parts of zinc oxide and 40 parts of glacial acetic acid are introduced into 750 parts of quinoline. The mixture is heated at from 225° to 235° C., under a slow stream of nitrogen and is kept at this temperature until perylenetetracarboxylic acid is no longer detected when a sample is boiled in dilute sodium carbonate solution, ie. for about 10 hours. After the mixture has been cooled to about 80° C., it is diluted with 1,000 parts of methanol and the suspension is poured onto 8,000 parts of methanol at room temperature and, after having been stirred overnight, is filtered. The material on the filter is washed with methanol and then with water, and is stirred with 3,500 parts of 2% strength aqueous sodium carbonate solution, the mixture is heated at about 95° C. and filtered, and the material on the filter is washed neutral and dried. Any traces of perylenetetracarboxylic acid still present are thereby removed. A very good yield of dye is obtained.

Analysis $C_{48}H_{42}O_4N_2$ (molecular weight 710) calculated: 81.1% C; 6.0% H; 9.0% O; 3.9% N; found: 79.8% C; 5.7% H; 9.6% O; 4.4 N.

EXAMPLE 5

98.6 parts of perylene-3,4,9,10-tetracarboxylic acid dianhydride, 356 parts of 2,6-diisopropylaniline and 49 parts of anhydrous zinc propionate are introduced into 750 parts of quinoline. The mixture is heated at from 225° to 235° C., under a slow stream of nitrogen, and is kept at this temperature until perylenetetracarboxylic acid can no longer be detected when a sample is boiled in dilute potassium carbonate solution, ie. for about 10 hours. After the mixture has been cooled to about 80° C., it is diluted with 1,000 parts of methanol and the suspension is poured onto 5,000 parts of methanol at room temperature and, after having been stirred overnight, is filtered. The material on the filter is washed with methanol and then with water, and is stirred with 3,500 parts of 2% strength aqueous potassium carbonate solution, the mixture is heated at about 95° C. and filtered, and the material on the filter is washed neutral and dried. Any traces of perylenetetracarboxylic acid still present are thereby removed. A very good yield of dye is obtained.

USE EXAMPLE 1

0.05 part of the diimide obtained as described in Example 1 is dry-blended, in a high-speed mixer, with 100 parts of milled mass-polymerized polystyrene. The mixture is melted, and homogenized, in an extruder at a barrel temperature of 200°-250° C. The colored plastic mass is granulated by die face-cutting or by drawing strands and cooling and chopping these. The granules obtained are then injection-molded at 200°-250° C. or compression-molded into various shapes. Luminous orange moldings, which fluoresce and are very lightfast, are obtained.

Instead of mass-polymerized polystyrene, it is also possible to use emulsion-polymerized polystyrene, suspension-polymerized polystyrene or a copolymer of styrene with butadiene and acrylonitrile or acrylic esters.

Similar colorations are obtained using the bis-imides prepared as described in Example 2 or 3.

USE EXAMPLE 2

0.05 part of perylene-3,4,9,10-tetracarboxylic acid bis-(2',6'-diisopropylanilide) (obtained as described in Example 4) is dry-blended, in a high-speed mixer, with 100 parts of milled mass-polymerized polystyrene. The mixture is melted, and homogenized, in an extruder at a barrel temperature of 200°-250° C. The colored plastic mass is granulated by die face-cutting or by drawing strands and cooling and chopping these. The granules obtained are then injection-molded at 200°-250° C. or compression-molded into various shapes. Luminous orange moldings which fluoresce and are very lightfast, are obtained.

Instead of mass-polymerized polystyrene, it is also possible to use emulsion-polymerized polystyrene, suspension-polymerized polystyrene or a copolymer of styrene with butadiene and acrylonitrile or acrylic esters.

I claim:
1. Perylene-3,4,9,10-tetracarboxylic acid diimide of the formula

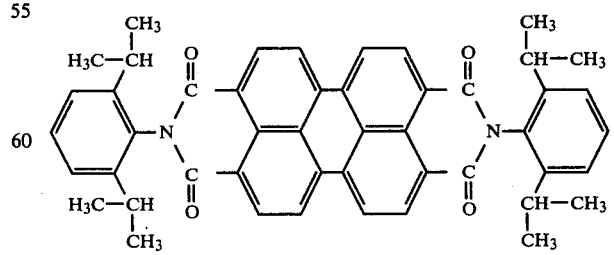

* * * * *